March 6, 1951     J. R. HAMILTON     2,543,965
FLIGHT CONTROL FOR MODEL AIRPLANES
Filed March 14, 1949     4 Sheets-Sheet 1
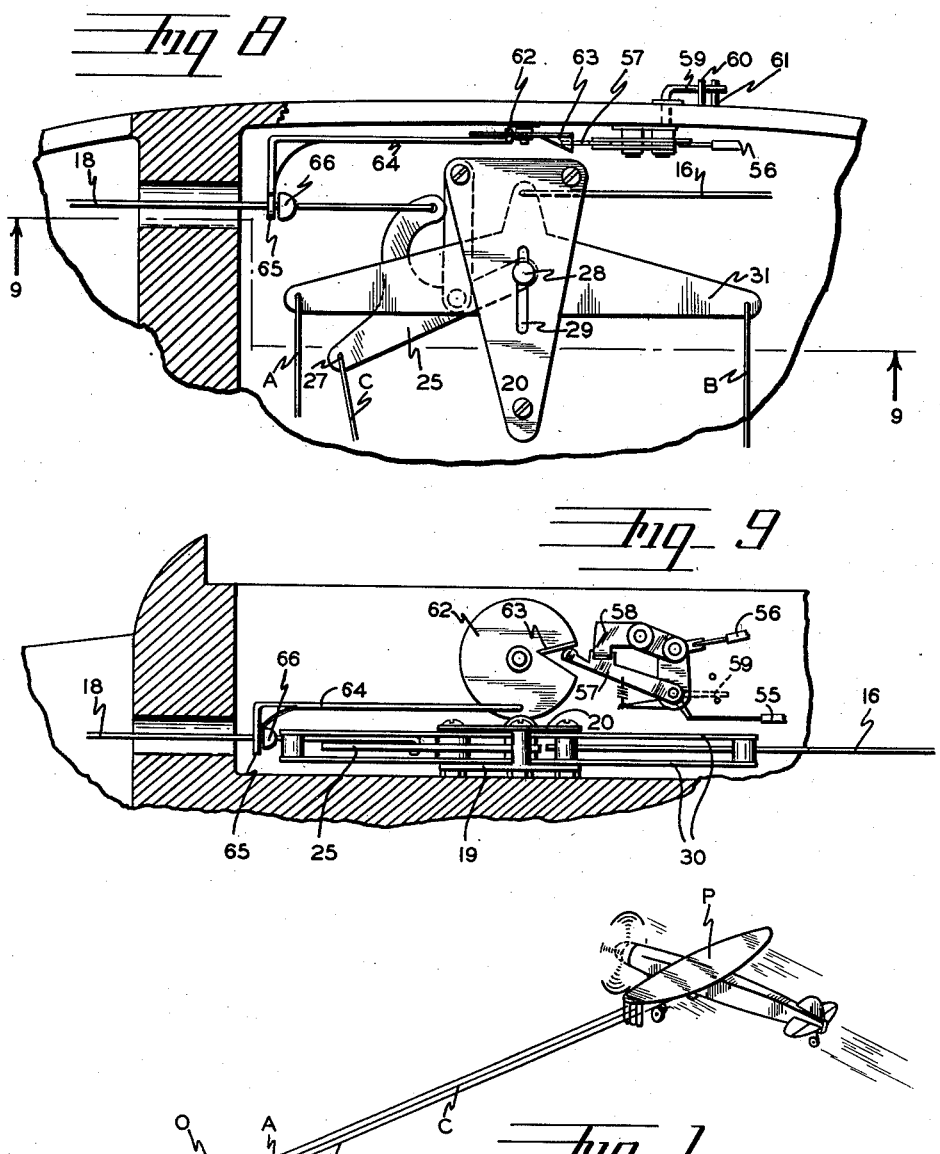
INVENTOR.
JOSEPH R HAMILTON
BY
ATTORNEY March 6, 1951  J. R. HAMILTON  2,543,965
FLIGHT CONTROL FOR MODEL AIRPLANES
Filed March 14, 1949  4 Sheets-Sheet 2
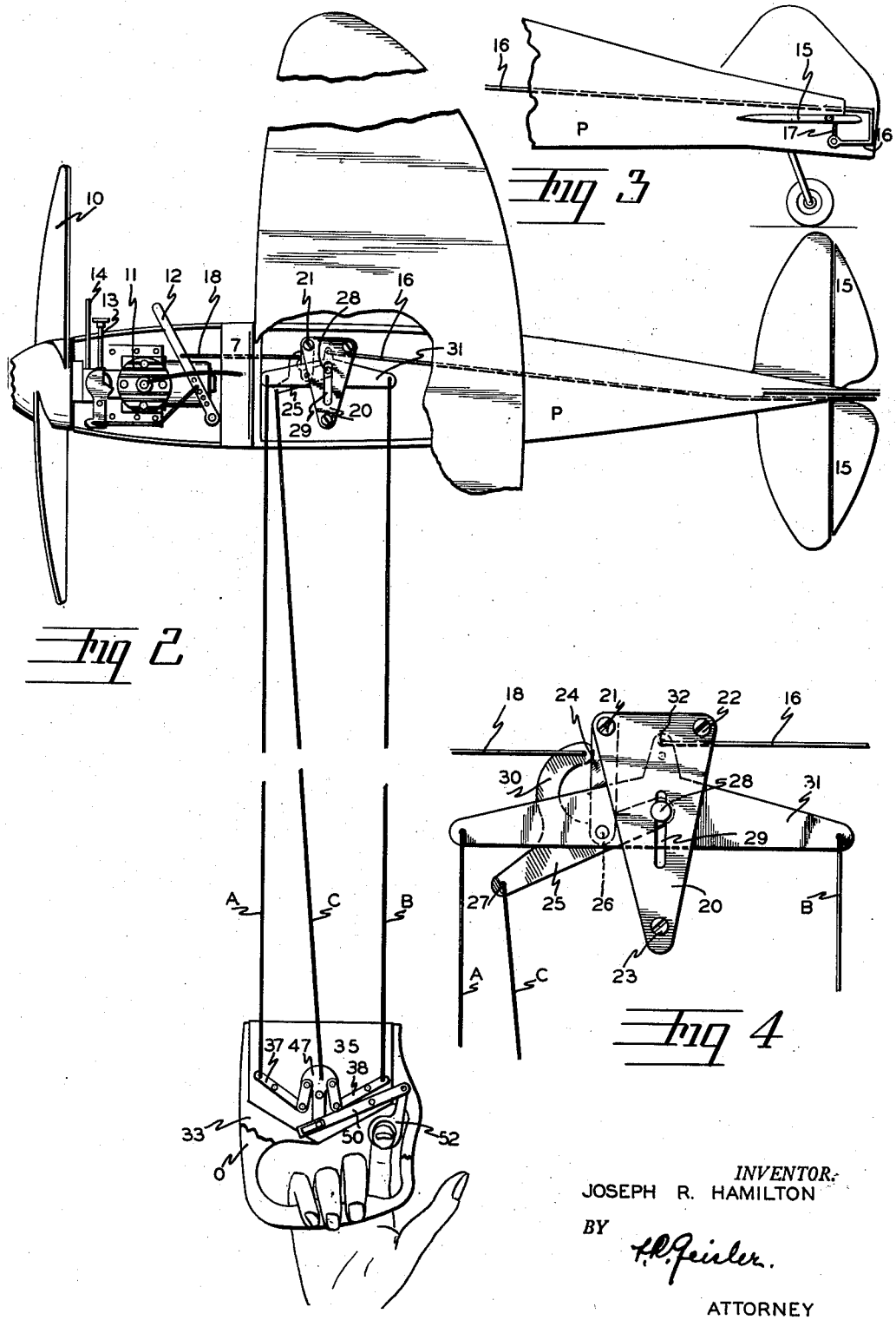
INVENTOR.
JOSEPH R. HAMILTON
BY
ATTORNEY

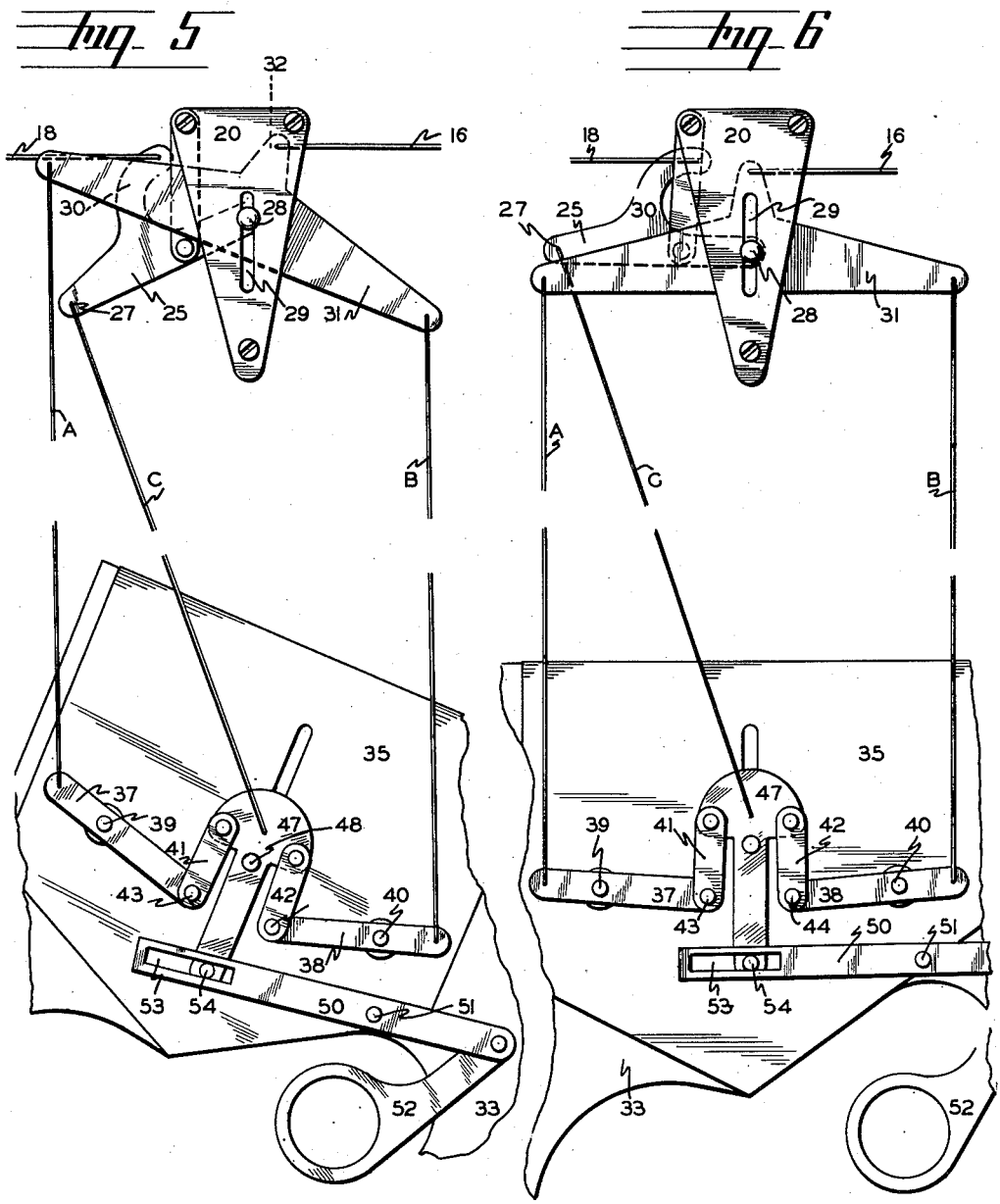

March 6, 1951 J. R. HAMILTON 2,543,965
FLIGHT CONTROL FOR MODEL AIRPLANES
Filed March 14, 1949 4 Sheets-Sheet 4

INVENTOR.
JOSEPH R HAMILTON
BY S. R. Geisler.
ATTORNEY

Patented Mar. 6, 1951

2,543,965

UNITED STATES PATENT OFFICE 2,543,965

FLIGHT CONTROL FOR MODEL AIRPLANES

Joseph R. Hamilton, Baker, Oreg.

Application March 14, 1949, Serial No. 81,289

7 Claims. (Cl. 46—77)

This invention relates in general to a mechanical triple-control connection in which three wires, or elements similarly employed, each serving to operate one part of a triple-control, can be selectively manipulated while an equalizing pull or tension is exerted on all three wires without increasing the pull or tension on any one wire beyond imposed that imposed on the others.

In particular, this invention relates to mechanical means through the medium of which three control wires, separately connected to a model airplane triple-control system, can be selectively manipulated to operate the respective controls, while the airplane is being flown, without causing the pull on any one wire to be greater than the pull on the others.

Further, and more specifically, this invention is concerned with means whereby three control lines can be separately attached to a model airplane and manipulated in a practical manner at all times while the airplane is in the air.

In the flying of model, motor driven airplanes, where the airplane is controlled by an operator on the ground who manually holds one or more wires or lines attached to the plane, it has heretofore not been considered feasible to have the airplane held by more than two control lines for the reason that any sudden variations in the course of the airplane during its flight would result in the airplane getting out of control. Thus, for example, when two control lines are used, it is possible for these to be attached to a pivoted bar on the airplane, at equal distances on opposite sides of the pivotal connection of the bar and the bar in turn connected to the elevators in the tail of the airplane so that the elevators can be raised up or down or held in neutral position directing the airplane as desired during its circulating flight. The other ends of the control lines are then similarly connected to a pivoted element held by and manipulated by the operator on the ground. As can readily be appreciated, the pull on the two control lines must be equal at all times under such conditions, or means provided to compensate for maintained unequal pull, otherwise such control of the elevators will not be constant or complete.

Heretofore in flying model airplanes attached by control lines through which operation of the elevators is controlled, as mentioned above, the motor of the airplane has been operated at a constant speed during the flight. Attempts to have a third control line attached to the airplane and connected with the motor throttle, or to the spark advancer, to enable the speed of the motor to be varied when desired while the airplane is in flight, have been unsuccessful because of the fact that a pull on the motor control line, for example, for temporarily speeding up the motor, produced slack in the other lines causing the airplane to fly wildly while the motor speed was being increased; then, on the other hand, insufficient pull, or improperly maintained pull, on the motor control line prevented maximum speed of the motor in the airplane at a time when maximum speed was desirable.

In my endeavor to find means whereby the motor speed of the airplane in the air could be constantly and satisfactorily controlled without any sacrifice of elevator control, I found that this was possible only if the three control lines could be so connected with the airplane that the centrifugal pull of the airplane in flight will always be equally divided between the three control lines.

The primary object of the present invention accordingly is to provide a mechanical equalizing means whereby an equal pull or tension can be maintained on three separate control lines regardless of their manipulation in the operation of their respective controls through their medium.

Another object of this invention is to provide practical means by which the motor speed of a model airplane can be varied as and when desired while the airplane is in the air.

An additional object of this invention is to provide a flight control mechanism for a model airplane in which the speed of the airplane as well as its direction of flight will be under control of the operator at all times.

Another object of this invention is to provide an improved flight control mechanism for a model airplane in which the ignition switch to the battery can be shut off while the plane is in flight whenever current from the battery is not needed, and thereby eliminate any useless drain on the battery.

A still further object of this invention is to provide an improved airplane flight control means which will be simple and inexpensive to manufacture, easy to install, and convenient and practical to use.

These objects and other incidental advantages I have been able to attain with a simple mechanism or control means constructed, arranged and employed as hereinafter described. In the description and explanation of the same, reference is to be made to the accompanying drawings in which:

Fig. 1 is a pictorial illustration indicating a model airplane being flown in the usual manner by an operator stationed on the ground but with three control wires, in place of the usual two control wires, connecting the operator with the airplane;

Fig. 2 is a more or less diagrammatic plan view of the airplane and operator's hand control for the same, but with portions of the airplane broken away to show the control mechanism and its connection with the airplane engine, and with the top cover of the operator's hand control removed to show the cooperating control mechanism for the three control wires held by the operator;

Fig. 3 is a fragmentary side elevation of the rear portion of the airplane of Fig. 2;

Fig. 4 is a plan view, drawn to a larger scale, of the control mechanism as shown positioned in the airplane of Fig. 2, the members of this control mechanism being set for a neutral flying position and with the airplane motor held at low speed;

Fig. 5 is a fragmentary plan view illustrating the same control mechanism in the airplane and the cooperating control mechanism for the hand of the operator, as shown in Fig. 2, but showing the members set for raising the elevators of the airplane so as to increase the altitude of the airplane while the airplane motor is held at the same operating speed;

Fig. 6 is a similar fragmentary plan view of the same control elements but showing the control members set for maintaining neutral position of the airplane elevators and for opening the motor throttle wider, or for advancing the spark of the airplane engine, to increase the motor speed of the airplane in flight;

Figure 7:
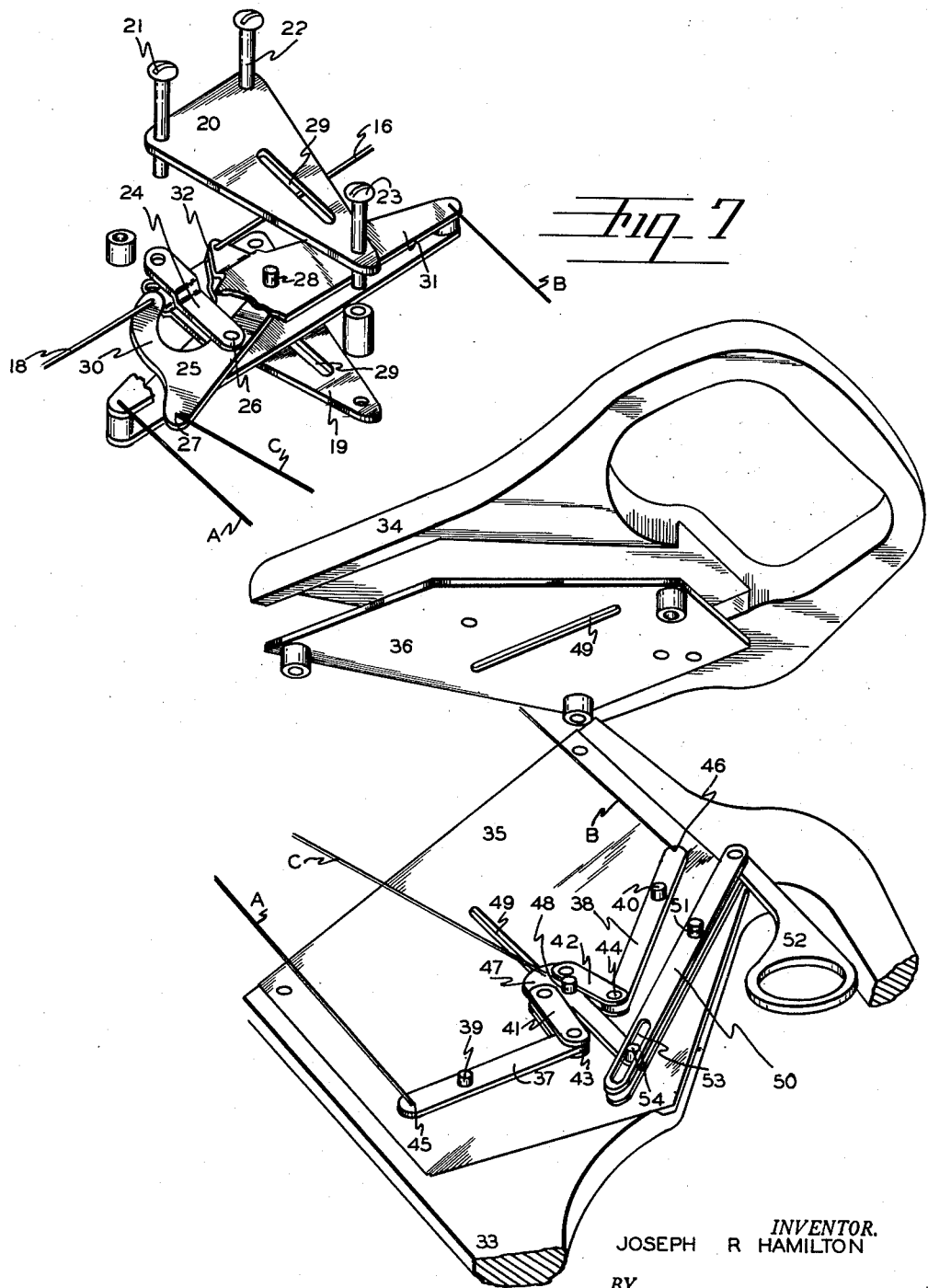

Fig. 7 is a perspective view of the various members of the portion of the control mechanism located in the airplane, showing the same separated from each other for the sake of clarity but in their relative arrangement, and similarly showing a perspective view of the members of the portion of the control mechanism held by the operator, the top plate and cover of the latter being shown lifted from the same, also for the sake of clarity;

Fig. 8 is an enlarged fragmentary plan section of a portion of the airplane illustrating means whereby the ignition switch to the battery may be shut off while the airplane is in flight; and Fig. 9 is a vertical section on line 9—9 of Fig. 8.

In Figs. 1 and 2 P indicates an airplane in flight, O the hand control held by the operator on the ground, A and B the control lines regulating the position of the elevators in the airplane, and C the control line by which the speed of the motor in the airplane is regulated in a manner presently to be described.

The airplane P, as shown in Fig. 2, has an engine mechanism for driving the propeller 10, which mechanism includes a miniature gasoline motor 11, a throttle valve lever 12, an idling jet adjuster 13, and a spark adjuster 14. A small flash-light battery (not shown) carried in the rear portion of the main body of the airplane, supplies the current for the ignition. The airplane has the usual wing and tail assembly and elevators 15 are hinged in the tail portion as usual. These elevators 15 are raised or lowered, or held in intermediate neutral flying position, by a rod 16, the rear end of which is formed into a reverse bend and is pivotally connected to an arm 17 (Fig. 3) rigidly attached to the elevators, so that longitudinal movement of the rod 16 will operate the elevators 15.

The throttle valve is normally held in closed position by spring means (not shown) but the throttle control lever 12 is also connected to a rod 18 so that a pull on rod 18 to the right (as viewed in Fig. 2) will cause the throttle lever 12, and thus the engine throttle, to be opened wider against the force of the spring means.

That portion of my improved control means which is located in the airplane, to which the rods 16 and 18 are connected and to which the three control wires A, B and C are also connected, can be understood most clearly by referring to Figs. 2, 4 and 7. The mechanism in question is mounted in a pair of spaced, identical, triangular supporting plates, thus a bottom plate 19 (Fig. 7) and a top plate 20. The plates 19 and 20 are secured together in spaced relationship by the screws or bolts 21, 22 and 23 which extend through suitable spacing sleeves between the plates and which also serve to secure the supporting plates, and therewith the entire mechanism, in place in the airplane. Preferably the screw 21 (Figs. 2 and 4) is located at the longitudinal center of gravity of the airplane, although the position may be varied if otherwise compensated for.

A link 24 (Figs. 4 and 7) is pivotally mounted on the screw 21 between the plates 19 and 20. A lever 25 is pivotally attached to the free end of the link 24 at the point 26. The control wire C is attached to one end of this lever 25, thus at the point 27. A pin 28 is mounted at the opposite end of the lever 25. The distance of the pin 28 from the fulcrum point 26 on the lever 25 is exactly one-half the distance of the point 27, at which the control wire C is attached, from the fulcrum 26. The pin 28 extends above and below the lever 25, and the plates 19 and 20 are provided with parallel slots 29, 29 in which the ends of the pin 28 are slidable. The lever 25 also has a curved arm 30 to which the rod 18 is connected.

A composite lever bar 31, composed of a pair of identically shaped plates secured together in spaced relationship, is pivoted at the center on the pin 28. As shown in Fig. 7 the two plates of this composite lever bar 31 pass respectively above and below the lever 25 with its supporting link 24, and the composite lever bar 31 extends between the two mounting plates 19 and 20 and the ends of the pin 28 extend through the center of the members of the composite lever bar 31 and thence into the slots 29 of the mounting plates 19 and 20, as previously mentioned. The control wires A and B are attached to opposite ends of the composite lever bar 31 at equal distances from the pivot pin 28. The two members of the composite lever bar 31 have central extending portions 32 which come together to form a center arm to which the rod 16 is attached.

From the description thus far, and referring to Fig. 4, it will be apparent that a pull, for example a pull of one pound, on each of the control wires A and B will cause a total pull of two pounds on the pin 28 which will counterbalance a pull of one pound on the control wire C, since the point 27 at which the control wire C is attached is twice as far from the fulcrum 26 on the lever 25 as the pin 28 on which the two pound pull occurs. In other words, this mechanism is so arranged as to equalize the pull on all three control wires A, B and C. This feature will be referred to later.

The cooperating portion of my improved control means which is held by the operator, which I have referred to as the hand control and which I have designated in general by the reference character O, will now be described with reference to Figs. 2 and 7. The entire hand control is housed in a pair of housing sections 33 and 34, formed of wood, plastic, metal or any suitable material, in a convenient shape to be held in the hand, and with a suitable loop portion or hand grip for the fingers, as illustrated in Fig. 2. The housing sections 33 and 34 are formed with interior recesses to accommodate a pair of spaced mounting plates 35 and 36 which are held together in spaced relationship by suitable screws or bolts and spacer sleeves.

A pair of identical levers 37 and 38 are pivotally mounted on the fixed pins 39 and 40 respectively, at their inner ends. These levers 37 and 38 are connected to links 41 and 42 respectively. The control wires A and B are attached to the outer ends of the levers 37 and 38 at the points 45 and 46 respectively. The distance of the points 45 and 46 from the corresponding pins 39 and 40 is the same for each lever and is one-half the distance of the points 43 and 44, at which the links 41 and 42 are attached, from the corresponding pins 39 or 40. The links 41 and 42 in turn are connected to a central member 47, shaped substantially as shown. The central member 47 carries a pin 48 which extends above and below the member 47 and the ends of which pin are slidable in the slots 49 provided in each of the mounting plates 35 and 36.

The control wire C is connected to the central member 47, as shown in Figs. 2 and 7, and an operating lever 50, pivoted on a fixed pin 51, has a finger link 52 connected to its outer end while its inner end is formed with a slot 53 in which a pin 54, secured to member 47, is engaged. Since the distance of points 45 and 46 from the pins 39 and 40 respectively is one-half the distance of the points 43 and 44 from the same pins, respectively, it will be apparent that a pull, for example, a pull of one pound on each of the control wires A and B, will together balance a pull of one pound on the control wire C.

The manner in which that portion of my improved control means which is mounted in the airplane and that portion which is carried in the hand control of the operator function in cooperation with each other, will now be described with reference to Figs. 2, 4, 5 and 6.

In Figs. 2 and 4 let it be assumed that the composite lever bar 31, connected with the airplane elevators by the rod 16 and operated by the control wires A and B, is momentarily holding the airplane elevators in neutral position. Further, let it be assumed that the position of the lever 25, connected to the rod 18, is momentarily arranged to hold the throttle at a position for desired speed of the airplane motor. Also let it be assumed that the total centrifugal pull exerted by the airplane in flight is three pounds, thus the pull on each of the control wires A, B and C at the moment being one pound.

Example I

Let it be assumed that the operator desires to move the elevators to cause the airplane in flight to climb higher while maintaining the same motor speed. To do this the operator turns the hand control sideways from the position illustrated in Fig. 2 to the position illustrated in Fig. 5, in order to adjust the position of the composite lever bar 31 and thus produce the desired elevator adjustment. If the operator does not change the pull on the finger link 52 the turning of the band hold will move the composite lever bar 31 to the desired control position without changing the position of the lever 25. It will be evident that the total pull of the airplane on the control wires A, B and C will still continue to be divided equally between them. Thus the desired elevator adjustment can be accomplished without necessarily changing the motor speed.

Example II

Let it be assumed that the operator now desires to increase the motor speed without changing the position of the elevators. With the hand control in the position shown in Fig. 2, and thus with the elevators held in neutral position, for example, the operator, without twisting his hand, increases the pull of his finger on the finger link 52. The elements in the hand control will then move into the relative positions illustrated in Fig. 6. Since the composite lever bar 31 is pivoted on the lever 25 in the airplane, and since the pull on each of the control wires A, B and C is equal, it will be apparent that increasing the pull on the finger link by the operator, causing the central member 47 and the connected levers 37 and 38 to move into the positions shown in Fig. 6, will cause the lever 25 in the airplane to change its relative position. In other words, this movement of the members will cause the throttle to be opened wider and the motor speed of the airplane to be increased. The elevators, however, will continue to be held in neutral position, and the total centrifugal pull of the airplane will continue to be divided equally among the three control lines A, B and C.

It will be apparent, of course, that the operator could also perform both changes in control at the same time. In other words, the operator can change the elevator adjustment and change the motor speed adjustment simultaneously by turning the hand and increasing the pull on the finger lever 23 at the same time. Thus control of the elevators and control of the motor speed are rendered entirely independent of each other, and the total pull of the airplane continues under various conditions of adjusted position of the elevators and/or the engine throttle to be equally divided among the three control lines.

While I have illustrated lever 25 and the rod 18 as being connected to the throttle lever for the airplane motor, the rod 18 could similarly be connected instead to the spark advancer in order to produce the desired motor acceleration.

In addition to controlling the motor speed of the airplane while the airplane is in the air, it may be desirable and possible from time to time to shut off the current from the battery, when the same is not needed, and thus conserve the battery. Since model airplanes, such as I have referred to, can carry only a small battery such as is commonly used for electric flash lights, the length of the life of the battery is relatively short under steady operation of the airplane motor with the ignition constantly turned on. To make it possible to shut off the current from the battery, whenever the battery current is not needed, while the airplane is in the air, I provide a simple mechanical means associated with the motor control and illustrated in Figs. 8 and 9.

A switch element, mounted in the airplane and arranged to close the battery circuit over conductor wires 55 and 56 (Fig. 9) includes a pivotally mounted contact element 57, connected with conductor 55 and movable into or out of electrical contact with terminal 58 which is connected with conductor 56.

An arm 59, extending through the outside of the airplane, is rigidly connected to the movable contact element 57 so that the switch can be opened or closed manually when the airplane is on the ground, the arm 59 being movable between the limit posts 60 and 61 (Fig. 8). A disc 62 (Fig. 9), rotatably mounted on the inside of the airplane, has a section 63 partly cut out and bent at right angles to the face of the disc and adapted, when the disc is rotated in clockwise direction (as viewed in Fig. 9), to engage the movable contact element 57. A bar 64, having one end pivotally connected to the disc 62 as shown, has the other end formed into a right angle bracket and terminates in an eye 65 through which the rod 18 passes but which will be engaged by a lug 66, which is secured to the rod 18 by a suitable set screw or other means, whenever the rod 18 moves a sufficient distance to the left (as viewed in Figs. 8 and 9).

The ignition control operates as follows: When the motor of the airplane is to be started, the ignition switch is turned on manually by means of the arm 59. The ignition switch remains turned on as long as the motor operates at any of the speeds produced as a result of a finger pull by the operator on the link 52 of the hand control. However, when the operator releases all finger pull on the link 52, thus permitting the rod 18 to move to extreme left position (as viewed in the figures), the ignition switch will then automatically be turned off and thus prevent any further drain on the battery until the ignition switch is again manually turned on when the airplane is on the ground and the motor is to be restarted.

It would be possible within the scope of my invention to make many modifications in the specific construction of the different members and portions of the control system and mechanism which I have illustrated and described. For example, the shape and construction of the individual levers could be modified, provided the levers to which the three separate control wires are attached are so connected as to cooperate in the carrying out of the principle of my invention of maintaining equally distributed tension on all three control lines while permitting selective manipulation and adjustment of the respective controls. The particular construction illustrated in the drawings, however I have found to be very satisfactory and practical and consequently I regard this as the preferred means of carrying out my invention when the invention is employed in connection with the flying of a model airplane.

I claim:

1. In a multiple control mechanism of the character described, a lever pivoted on a fulcrum mounting intermediate its ends, a control line attached to one end of said lever, a second lever pivotally mounted on the other end of said first mentioned lever and at a distance from said fulcrum equal to half the distance from said fulcrum to the point of attachment of said control line, a member operated by said first mentioned lever, means exerting a force to urge said member in one direction, said first mentioned lever, when a pull is exerted on said control line, exerting a force in opposition to the force of said means, the pivotal mounting of said second lever constituting the fulcrum point of said second lever and located midway between the ends of said second lever, control lines attached to said ends of said second lever at equal distances from said fulcrum point of said second lever for moving said second lever, and a member operated by pivotal movement of said second lever, whereby said first mentioned member and said second mentioned member can be selectively operated by movement of the respective control lines while an equalized pull is maintained on all three of said control lines.

2. In a multiple control system of the character described for the flying of a model airplane, a lever pivoted on a fulcrum mounting intermediate its ends, a control line attached to one end of said lever, a second lever pivotally mounted on the other end of said first mentioned lever and at a distance from said fulcrum equal to half the distance from said fulcrum to the point of attachment of said control line, a motor speed governing member connected with said first mentioned lever, spring means exerting a force to urge said member in one direction, said first mentioned lever, when a pull is exerted on said control line, exerting a force in opposition to the force of said spring means, the pivotal mounting of said second lever constituting the fulcrum point of said second lever and located midway between the ends of said second lever, control lines attached to said ends of said second lever at equal distances from said fulcrum point of said second lever for moving said second lever, and an elevator operating member operated by pivotal movement of said second lever, whereby said motor speed governing member and said elevator operating member can be selectively operated by movement of the respective control lines while an equalized pull is maintained on all three of said control lines.

3. A multiple control mechanism of the character described including two portions connected by three control lines, a lever in one of said portions pivoted on a fulcrum mounting, intermediate its ends one of said control lines attached to one end of said lever, a second lever pivotally mounted on the other end of said first mentioned lever and at a distance from said fulcrum equal to half the distance from said fulcrum to the point of attachment of said control line, a member operated by said first mentioned lever, means exerting a force to urge said member in one direction, said first mentioned lever, when a pull is exerted on said control line, exerting a force in opposition to the force of said means, the pivotal mounting of said second lever constituting the fulcrum point of said second lever and located midway between the ends of said second lever, the other two of said control lines attached to said ends of said second lever at equal distances from said fulcrum point of said second lever for moving said second lever, a member operated by pivotal movement of said second lever, whereby said first mentioned member and said second mentioned member can be selectively operated by movement of the respective control lines while an equalized pull is maintained on all three of said control lines, the other portion of said mechanism including a mounting element, movable members supported by said element and connected with said three control lines respectively, and leverage connection between said members causing any relative pull between said element and said control lines to be equally distributed on said lines.

4. A multiple control system of the character described for the flying of a model airplane including a portion of the control system located in the airplane, and a cooperating portion connected with said first mentioned portion by three separate control lines, a lever in said first mentioned portion pivoted on a fulcrum mounting intermediate its ends, one of said control lines attached to one end of said lever, a second lever pivotally mounted on the other end of said first mentioned lever and at a distance from said fulcrum equal to half the distance from said fulcrum to the point of attachment of said control line, a motor speed governing member connected with said first mentioned lever, spring means exerting a force to urge said member in one direction, said first mentioned lever, when a pull is exerted on said control line, exerting a force in opposition to the force of said spring means, the pivotal mounting of said second lever constituting the fulcrum point of said second lever and located midway between the ends of said second lever, the other two of said control lines attached to said ends of said second lever at equal distances from said fulcrum point of said second lever for moving said second lever, an elevator operating member operated by pivotal movement of said second lever, whereby said motor speed governing member and said elevator operating member can be selectively operated by movement of the respective control lines while an equalized pull is maintained on all three of said control lines, said cooperating portion of said system including a mounting element, movable members supported by said element and connected with said three control lines respectively, and leverage connection between said members causing any relative pull between said element and said control lines to be equally distributed on said lines.

5. A multiple control mechanism for the flying of a model airplane comprising a portion of the control mechanism located in the airplane and a cooperating portion connected with said first mentioned portion by three separate control lines, a lever in said first mentioned portion pivoted on a fulcrum mounting intermediate its ends, one of said control lines attached to one end of said lever, a second lever pivotally mounted on the other end of said first mentioned lever and at a distance from said fulcrum equal to half the distance from said fulcrum to the point of attachment of said control line, a motor speed governing mmeber connected with said first mentioned lever, means exerting a force to urge said member in one direction, said first mentioned lever, when a pull is exerted on said control line, exerting a force in opposition to the force of said means, the pivotal mounting of said second lever constituting the fulcrum point of said second lever and located midway between the ends of said second lever, the other two of said control lines attached to said ends of said second lever at equal distances from said fulcrum point of said second lever for moving said second lever, an elevator operating member operated by pivotal movement of said second lever, whereby said motor speed governing member and said elevator operating member can be selectively operated by movement of the respective control lines when an equalized pull is maintained on all three of said control lines, said cooperating portion of said mechanism including a mounting element, a pair of identical levers pivotally supported intermediate their ends on said mounting element, said other two of said control lines connected to an end of each of said last mentioned levers respectively, a movable member connected with the opposite ends of said last mentioned levers at points located twice as far from their respective pivotal supports as the points at which their respective control lines are attached, said first mentioned control line connected to said last mentioned movable member, and means for adjusting the position of said last mentioned member on said element, whereby relative pull between said element and said control lines will be distributed equally on all three of said control lines regardless of adjusted positions of said last mentioned member and said last mentioned levers.

6. A multiple control mechanism for the flying of a model airplane comprising a portion of the control mechanism located in the airplane and a cooperating portion adapted to be held by an operator's hand and connected with said first mentioned portion by three separate control lines, a lever in said first mentioned portion pivoted on a fulcrum mounting intermediate its ends, one of said control lines attached to one end of said lever, a second lever pivotally mounted on the other end of said first mentioned lever and at a distance from said fulcrum equal to half the distance from said fulcrum to the point of attachment of said control line, a motor speed governing member connected with said first mentioned lever, spring means exerting a force to urge said member in one direction to a position producing moderate motor speed, said first mentioned lever, when a pull is exerted on said control line, exerting a force in opposition to the force of said spring means to cause increased motor speed, the pivotal mounting of said second lever constituting the fulcrum point of said second lever and located midway between the ends of said second lever, the other two of said control lines attached to said ends of said second lever at equal distances from said fulcrum point of said second lever for moving said second lever, an elevator operating member operated by pivotal movement of said second lever, whereby said motor speed governing member and said elevator operating member can be selectively operated by movement of the respective control lines while an equalized pull is maintaind on all three of said control lines, said cooperating portion of said mechanism including a mounting element providing a hand hold, a pair of identical levers pivotally supported intermediate their ends on said mounting element, said other two of said control lines connected to an end of each of said last mentioned levers respectively, a movable central member connected with the opposite ends of said last mentioned levers at points located twice as far from their respective pivotal supports as the points at which their respective control lines are attached, said first mentioned control line connected to said last mentioned central member, and means for adjusting the position of said last mentioned member on said element, whereby relative pull between said element and said control lines will be distributed equally on all three of said control ines regardless of adjusted positions of said last mentioned member and said last mentioned levers.

7. The combination set forth in claim 6 with the addition of switch means connected with said motor speed governing member for automatically shutting off the ignition for the motor with a predetermined movement of said motor speed governing member.

JOSEPH R. HAMILTON.

REFERENCES CITED

The following references are of record in the file of this patent:

UNITED STATES PATENTS

| Number | Name | Date |
| --- | --- | --- |
| 1,710,002 | Pearson | Apr. 23, 1929 |
| 2,292,416 | Walker | Aug. 11, 1942 |